US009766495B2

(12) United States Patent
Iwatsu et al.

(10) Patent No.: US 9,766,495 B2
(45) Date of Patent: Sep. 19, 2017

(54) TRANSFLECTIVE TYPE LIQUID CRYSTAL PANEL

(71) Applicant: InnoLux Corporation, Miao-Li county (TW)

(72) Inventors: Akihiro Iwatsu, Miao-Li County (TW); Cheng-Min Wu, Miao-Li County (TW); Sheng-Feng Huang, Miao-Li County (TW); Cheng-Hsiao Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 65 days.

(21) Appl. No.: 14/848,617

(22) Filed: Sep. 9, 2015

(65) Prior Publication Data
US 2016/0085116 A1 Mar. 24, 2016

Related U.S. Application Data

(60) Provisional application No. 62/053,856, filed on Sep. 23, 2014.

(30) Foreign Application Priority Data

Nov. 21, 2014 (TW) .............................. 103140384 A

(51) Int. Cl.
*G02F 1/1335* (2006.01)
*G02F 1/1362* (2006.01)
*G09G 3/36* (2006.01)

(52) U.S. Cl.
CPC .. *G02F 1/133555* (2013.01); *G02F 1/136286* (2013.01); *G09G 3/3648* (2013.01);
(Continued)

(58) Field of Classification Search
CPC ........ G02F 1/133555; G02F 1/136286; G09G 3/3648; G09G 2320/0673;
(Continued)

(56) References Cited

U.S. PATENT DOCUMENTS 8,902,141 B2* 12/2014 Noguchi ........... G02F 1/136286
257/40
9,122,117 B2* 9/2015 Ro ..................... G02F 1/136213
(Continued)

FOREIGN PATENT DOCUMENTS

JP 2007264443 A * 10/2007
TW 200712707 4/2007

OTHER PUBLICATIONS

Chinese language office action dated Nov. 16, 2015, issued in application No. TW 103140384.

*Primary Examiner* — Hoan C Nguyen
(74) *Attorney, Agent, or Firm* — McClure, Qualey & Rodack, LLP

(57) ABSTRACT

A transflective type liquid crystal panel includes a plurality of sub-pixels arranged in rows and columns to form a sub-pixel array, a plurality of first wires extending along the row direction or the column direction, and a plurality of second wires which are parallel with the first wires. The plurality of sub-pixels includes transmissive sub-pixels and reflective sub-pixels. Each row and column in the sub-pixel array has both transmissive sub-pixels and reflective sub-pixels. The transmissive sub-pixels are connected to and driven by the first wires, and the reflective sub-pixels are connected to and driven by the second wires.

20 Claims, 19 Drawing Sheets

(52) U.S. Cl.
CPC ........... *G09G 2300/0426* (2013.01); *G09G 2300/0456* (2013.01); *G09G 2320/0247* (2013.01); *G09G 2320/0673* (2013.01)

(58) Field of Classification Search
CPC ... G09G 2300/0456; G09G 2320/0247; G09G 2300/0426
USPC .................................................. 349/141–143
See application file for complete search history.

(56) References Cited

U.S. PATENT DOCUMENTS

| | | | |
|---|---|---|---|
| 9,293,101 B2 * | 3/2016 | Kim | ............... G09G 3/3614 |
| 2004/0004685 A1 * | 1/2004 | Luo | ............... G02F 1/133555 349/113 |
| 2004/0252262 A1 * | 12/2004 | Park | ............... G02F 1/133555 349/114 |
| 2005/0146657 A1 | 7/2005 | Wen et al. | |
| 2007/0080344 A1 * | 4/2007 | Kim | ............... G02F 1/133555 257/40 |
| 2014/0307206 A1 * | 10/2014 | Xie | ............... G02F 1/133555 349/96 |

* cited by examiner

TRANSFLECTIVE TYPE LIQUID CRYSTAL PANEL

CROSS REFERENCE TO RELATED APPLICATIONS

This application claims the benefit of U.S. Provisional Application No. 62/053,856 filed on Sep. 23, 2014, and Taiwan Patent Application No. 103140384, filed on Nov. 21, 2014, the entireties of which are incorporated by reference herein.

BACKGROUND

Field of the Disclosure

The present disclosure relates to a transflective type liquid crystal panel, and in particular to a transflective type liquid crystal panel capable of reducing driving complexity.

Description of the Related Art

Conventional liquid crystal panels include: the transmissive type, reflective type, and transflective type. A transmissive type liquid crystal panel has good display qualities but is not suited for being used in a high ambient light environment. The reflective type liquid crystal panel is able to reflect the ambient light to display images so the backlight unit is unnecessary, which reduces power consumption. However, the reflective type liquid crystal panel cannot be used in a dark environment. Moreover, the reflective type liquid crystal panel is generally used to display low quality images because of insufficiency of brightness and color saturation. The transflective type liquid crystal panel combines the advantages of both the transmissive type and the reflective type, which drives transmissive sub-pixels and reflective sub-pixels to meet several kinds of display requirements.

However, the existing transflective type liquid crystal panel has the problem of having a complicated driving scheme. FIG. 1 shows a structure of a sub-pixel array of a conventional transflective type liquid crystal panel. T is representative of a transmissive sub-pixel. R is representative of a reflective sub-pixel. Col[n], Col[n+1], Col[n+2], Col[n+3], Col[n+4], and Col[n+5] are representative of data lines in the column direction. Row[m], Row[m+1], Row[m+2], Row[m+3], Row[m+4], and Row[m+5] are representative of gate lines in the row direction. It can be seen from FIG. 1 that the transmissive sub-pixel T and the reflective sub-pixel R are arranged alternately in the row direction and in the column direction. The transmissive sub-pixel T and the reflective sub-pixel R are driven in sequence.

However, if a driving IC supplies voltage to the sub-pixel T and the reflective sub-pixel R according to the same gamma curve (gray level to brightness curve), the voltage-brightness curves of the sub-pixel T and the reflective sub-pixel R do not match, causing the display quality to be poor, and causing flickering or image retention due to the different charge residual phenomenon occurring on the sub-pixel T and the reflective sub-pixel R. On the other hand, if the driving IC supplies voltage to the sub-pixel T and the reflective sub-pixel R according to the respective gamma curves, as for one data line, every time one row is scanned, the data line has to switch supplying voltages corresponding to one gamma curve to supplying voltages corresponding to the other gamma curve to drive a sub-pixel T or a reflective sub-pixel R; as for all data lines, every time one row is scanned, the source driver has to supply voltage corresponding to the transmissive gamma curve and voltage corresponding to the reflective gamma curve at the same time to all of the data lines. Therefore, the conventional transflective type liquid crystal panel needs complicated data processing, so the driving IC needs a high computing ability and the power consumption on the driving IC is high.

In view of the above problem, the purpose of the disclosure is to provide a transflective type liquid crystal panel with a new layout capable of reducing driving complexity, improving driving efficiency, and attempting to reduce power consumption.

BRIEF SUMMARY OF THE DISCLOSURE

A detailed description is given in the following embodiments with reference to the accompanying drawings.

The disclosure provides a transflective type liquid crystal panel, including: a plurality of sub-pixels arranged in rows and columns to form a sub-pixel array; a plurality of first wires extending along the row direction or the column direction; and a plurality of second wires which are parallel with the first wires, wherein the plurality of sub-pixels comprises transmissive sub-pixels and reflective sub-pixels, and each row and column in the sub-pixel array has both transmissive sub-pixels and reflective sub-pixels, wherein the transmissive sub-pixels are connected to and driven by the first wires, and the reflective sub-pixels are connected to and driven by the second wires.

In the transflective type liquid crystal panel of an embodiment, the first wire and the second wire are gate lines extending in the row direction and arranged alternately in the column direction.

In the transflective type liquid crystal panel of another embodiment, the first wire and the second wire are gate lines extending in the row direction and arranged between each pair of two adjacent sub-pixel rows. The first wire includes a first electrode layer and a second electrode layer.

In the transflective type liquid crystal panels of the above two embodiments, one transmissive sub-pixel and one reflective sub-pixel are arranged alternately in the row direction and the column direction. Otherwise, one transmissive sub-pixel and one reflective sub-pixel are arranged alternately in the column direction, and three transmissive sub-pixels and three reflective sub-pixels are arranged alternately in the row direction.

In the transflective type liquid crystal panel of an embodiment, the first wire and the second wire are data lines extending in the column direction and arranged alternately in the row direction.

In the transflective type liquid crystal panel of another embodiment, the first wire and the second wire are data lines extending in the column direction and arranged between each pair of two adjacent sub-pixel columns. The first wire includes a first electrode layer and a second electrode layer.

In the transflective type liquid crystal panels of the above two embodiment, one transmissive sub-pixel and one reflective sub-pixel are arranged alternately in the row direction and the column direction. Otherwise, one transmissive sub-pixel and one reflective sub-pixel are arranged alternately in the row direction, and three transmissive sub-pixels and three reflective sub-pixels are arranged alternately in the column direction.

Furthermore, the transflective type liquid crystal panel of another embodiment, including: a plurality of third wires and fourth wires which are data lines extending along the column direction, wherein the transmissive sub-pixels are connected to and driven by the third wires, and the reflective sub-pixels are connected to and driven by the fourth wires, and the third wire and the fourth wire are arranged alternately in the row direction.

According to the above embodiments, with a new layout or a new driving method, the disclosure can reduce the driving complexity, improve the driving efficiency, and attempt to reduce power consumption.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

This description is made for the purpose of illustrating the general principles of the disclosure and should not be taken in a limiting sense. The scope of the disclosure is best determined by reference to the appended claims.

Figure 2:
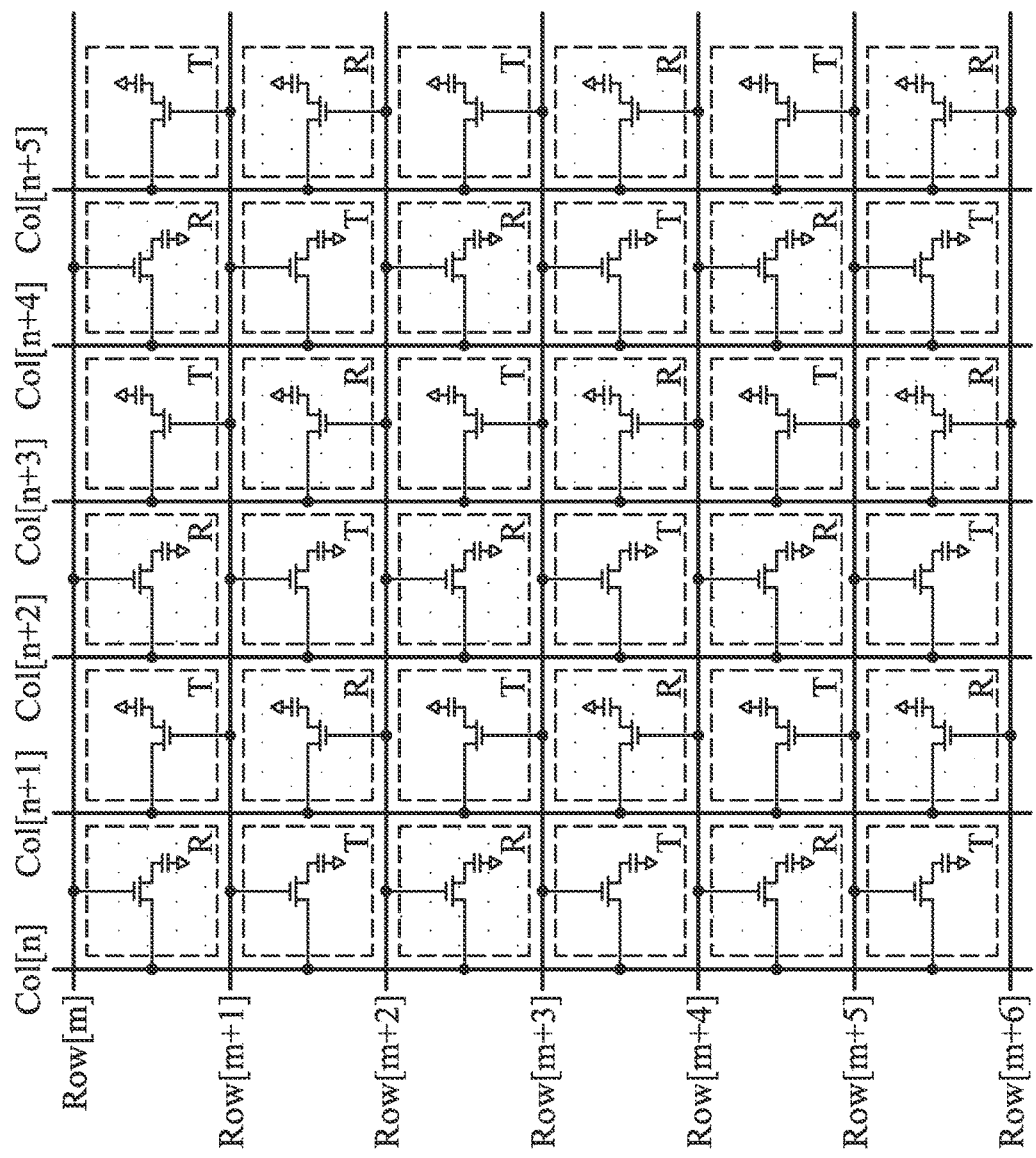
FIG. 2 shows a structure of a sub-pixel array of a transflective type liquid crystal panel in accordance with Embodiment 1 of the disclosure.

The embodiments of the disclosure are described with reference to the drawings. FIG. 2 shows a structure of a sub-pixel array of a transflective type liquid crystal panel in accordance with Embodiment 1 of the disclosure.

It can be seen from FIG. 2 that the transmissive sub-pixel T and the reflective sub-pixel R are arranged alternately in the row direction and in the column direction to form a chess-board pattern. This arrangement is the same as the prior art. However, there are only the reflective sub-pixels R in the first row connected to the first gate line Row[m]. The transmissive sub-pixels T in the first row are not connected to the first gate line Row[m], but connected to the second gate line Row[m+1]. The transmissive sub-pixels T in the second row are also connected to the second gate line Row[m+1], but the reflective sub-pixels R in the second row are connected to the third gate line Row[m+2]. The remaining sub-pixels are arranged in the same manner. Namely, the reflective sub-pixels R in two adjacent rows share one gate line, and the transmissive sub-pixels T in two adjacent rows share one gate line. At last, the reflective sub-pixels R in the last row (the sixth row shown in FIG. 2) are connected to the seventh gate line Row[m+6]. On the other hand, the data lines are arranged in the normal manner. A data line of one column is connected to all sub-pixels including the transmissive sub-pixels T and the reflective sub-pixels R in the same column. The transmissive sub-pixel T and the reflective sub-pixel R are arranged alternately in the column direction. The number of transmissive sub-pixels T and the number of reflective sub-pixels R of the sub-pixel array are both even. For example, in the case of a full HD resolution, the number of transmissive sub-pixels T is 3,110,400 (1920×3×1080/2) and the number of reflective sub-pixels R is also 3,110,400 (1920×3×1080/2). FIG. 2 only shows a 6×6 sub-pixel array for ease of explanation.

Every gate line in the sub-pixel array of Embodiment 1 is connected to a sub-pixel above the gate line and a sub-pixel below the gate line in sequence except for the first gate line and the last gate line. For convenience, this arrangement method for the wire is called "flip arrangement." Therefore, the structure of Embodiment 1 can shortly be called "flip arrangement for gate line and normal arrangement for data line."

In embodiment 1, the transmissive sub-pixel T and the reflective sub-pixel R are connected to different gate lines. In other words, one gate line is used to drive either the transmissive sub-pixel T or the reflective sub-pixel R. In comparison with the prior art, although an addition gate line Row[m+6] is required, once a gate line is scanned, the source driver doesn't have to supply voltage corresponding to transmissive gamma curve and voltage corresponding to the reflective gamma curve at the same time to all data line, but the source driver can only supply voltage corresponding to a single gamma curve to all data lines. Furthermore, the gate line group connected to the transmissive sub-pixels T and the gate line group connected to the reflective sub-pixels R can be scanned respectively. In this case, the source driver can only supply voltage corresponding to transmissive gamma curve when the gate line group connected to the transmissive sub-pixels T is scanned. On the other hand, the source driver can only supply voltage corresponding to reflective gamma curve when the gate line group connected to the reflective sub-pixels R is scanned. The driving complexity can be reduced substantially. Because the transmissive sub-pixels T and the reflective sub-pixels R are connected to different gate lines. According to the environment, it is possible that the gate lines connected to the transmissive sub-pixels T are scanned alone (for example, a transmissive mode is provided indoors or in a dark environment), or the gate lines connected to the reflective sub-pixels R are scanned alone (for example, a reflective mode is provided outdoors or in a power save mode). It is beneficial to saving power and meeting various display requirements for portable devices.

Figure 15:
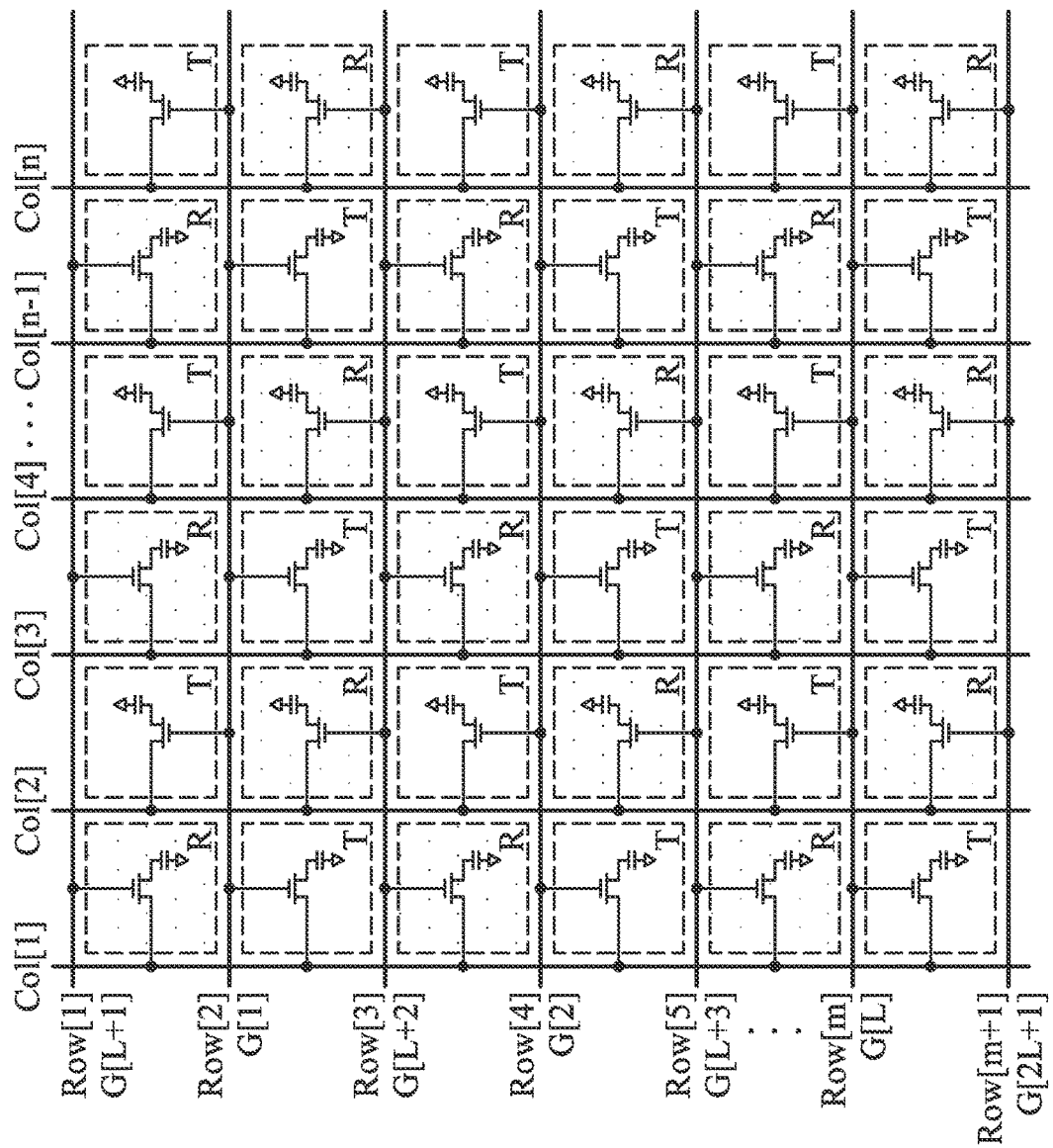
FIG. 15 is a diagram for explaining the driving method for the transflective type liquid crystal of Embodiment 1.
Figure 16:
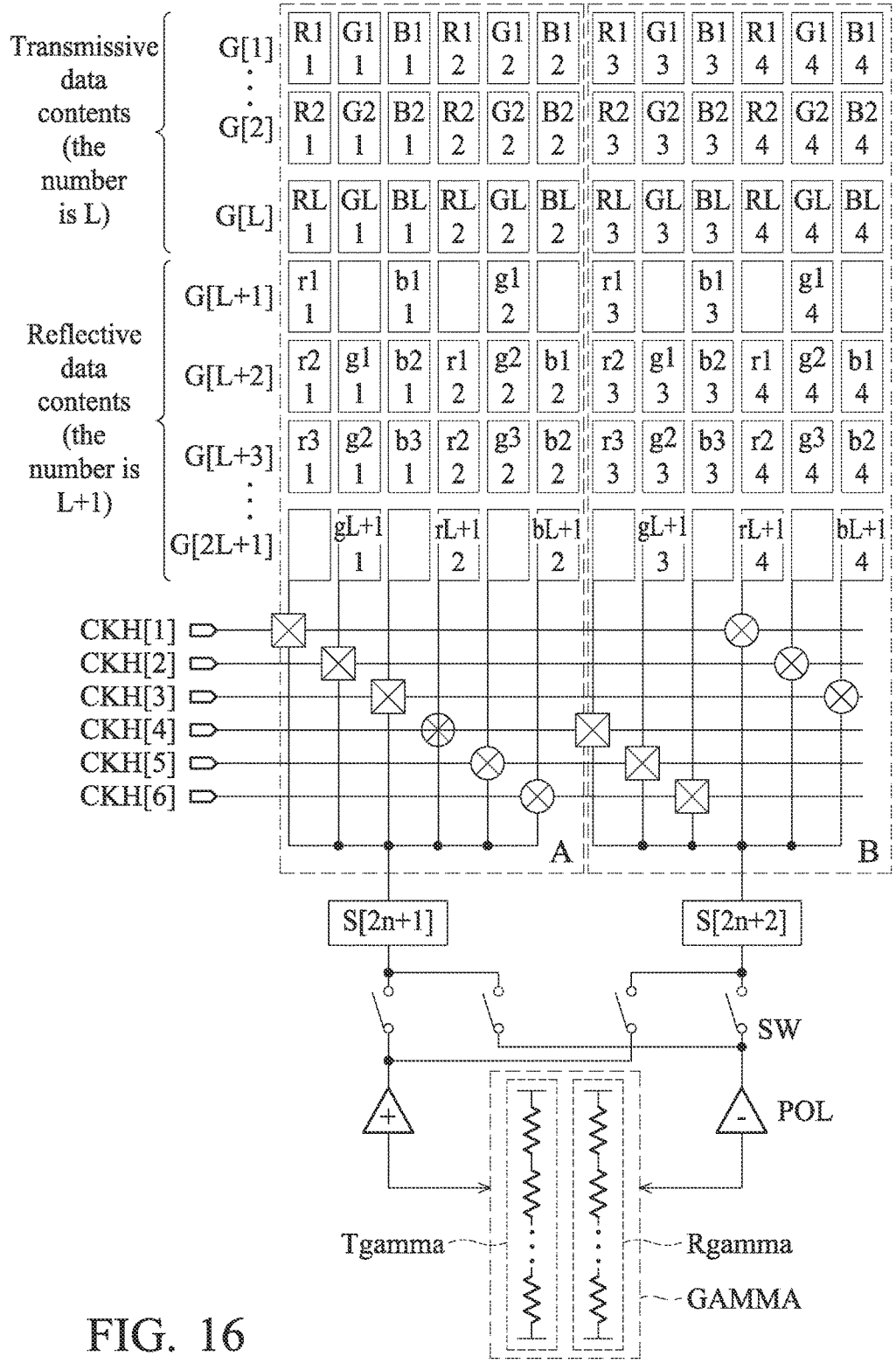
FIG. 16 is a diagram for explaining the driving method for the transflective type liquid crystal of Embodiment 1.

FIGS. 15 and 16 are diagrams for explaining a driving scheme. FIG. 15 shows a sub-pixel array. The transmissive sub-pixels T and the reflective sub-pixels R form an array having n columns and m rows. There are 2m+1 gate lines and n data lines. The transmissive sub-pixels T and the reflective sub-pixels R are connected to each gate line in the manner of flip arrangement, wherein the reflective sub-pixels R are connected to the odd gate lines and the transmissive sub-pixels T are connected to the even gate lines. Each data line is connected to the transmissive sub-pixels T and the reflective sub-pixels R. FIG. 16 shows a circuit connection and output data of a source driver IC. The source driver IC comprises a gamma curve voltage unit GAMMA having a transmissive gamma curve voltage element Tgamma and a reflective gamma curve voltage element Rgamma; a plurality of polarization units POL, each of which is connected to a switch unit SW and the gamma curve voltage unit GAMMA; a plurality of switch units SW, each of which is connected to a data output terminal S; and a plurality of 1 to 6 demultiplexers (1 to 3, 1 to 9, 1 to 4, 1 to 8, etc is also appropriate), each of which is connected to the data output terminal S to receive the data signals and control the sequence and the addressing of the data signals by the signals CKH[1]~CKH[6].

As shown in FIGS. 15 and 16, the number of even gate lines ROW[2]~ROW[m] is L and those are connected to the transmissive sub-pixels T. The contents of the data signal G[1] corresponding to the gate line Row[2] are R1_1, G1_1, B1_1, R1_2, G1_2, B1_2, . . . , R1_(n/3), G1_(n/3), B1_(n/3). The form of the contents of the other data signal G[2]~G[L] are the same as those of the data signal G[1]. The number of odd gate lines ROW[1]~ROW[m+1] is L+1 and those are connected to the reflective sub-pixels R. The contents of the data signal G[L+1] corresponding to the gate line Row[1] are r1_1, b1_1, g1_2, . . . , g1_(n/3). The form of the contents of the other data signal G[L+2]~G[2L+1] are the same to those of the data signal G[1]. There are no corresponding reflective sub-pixels R in the even columns Col[2], Col[4], and so on, connected to the gate line Row[1], so the data signal G[L+1] has no contents in the even columns Col[2], Col[4], and so on. Similarly, there are no corresponding reflective sub-pixels R in the odd columns Col[1], Col[3], and so on, connected to the gate line Row[m+1], so the data signal G[2L+1] has no contents in the odd columns Col[1], Col[3], and so on.

Because the transmissive sub-pixel T and the reflective sub-pixel R are connected to different gate lines, the advantages such as saving power, matching optical gamma curves, performing inversion, or reducing flicker can be achieved by controlling the scanning sequence of the gate lines, the scanning frequency of the gate lines, or the output data of the data lines. As shown in FIGS. 15 and 16, in a mix mode, the even gate lines Row[2]~Row[m] connected to the transmissive sub-pixel T are scanned first, and then the odd gate lines Row[1]~Row[m+1] connected to the reflective sub-pixel R are scanned. In a transmissive mode (T-mode), the even gate lines Row[2]~Row[m] connected to the transmissive sub-pixel T are scanned first, and then the odd gate lines Row[1]~Row[m+1] connected to the reflective sub-pixel R are scanned at a lower frequency (for example, ⅙ of the original scanning frequency) and the data signals G[L+1]~G[2L+1] supplied to the reflective sub-pixel R are low gray level or 0 gray level (black). In this way, the reflective gamma curve voltage element Rgamma of the source driver can obtain a longer idle time to save energy when the touch liquid crystal display panel is used indoors. In a reflective mode (R-mode), the odd gate lines Row[1]~Row[m+1] connected to the reflective sub-pixel R are scanned first, and then the even gate lines Row[2]~Row[m] connected to the transmissive sub-pixel T are scanned at a lower frequency (for example, ⅙ of the original scanning frequency) and the data signals G[1]~G[L] supplied to the transmissive sub-pixel T are low gray level or 0 gray level (black). In this way, the transmissive gamma curve voltage element Tgamma of the source driver can obtain a longer idle time to save energy when the touch liquid crystal display panel is used outdoors.

Figure 1:
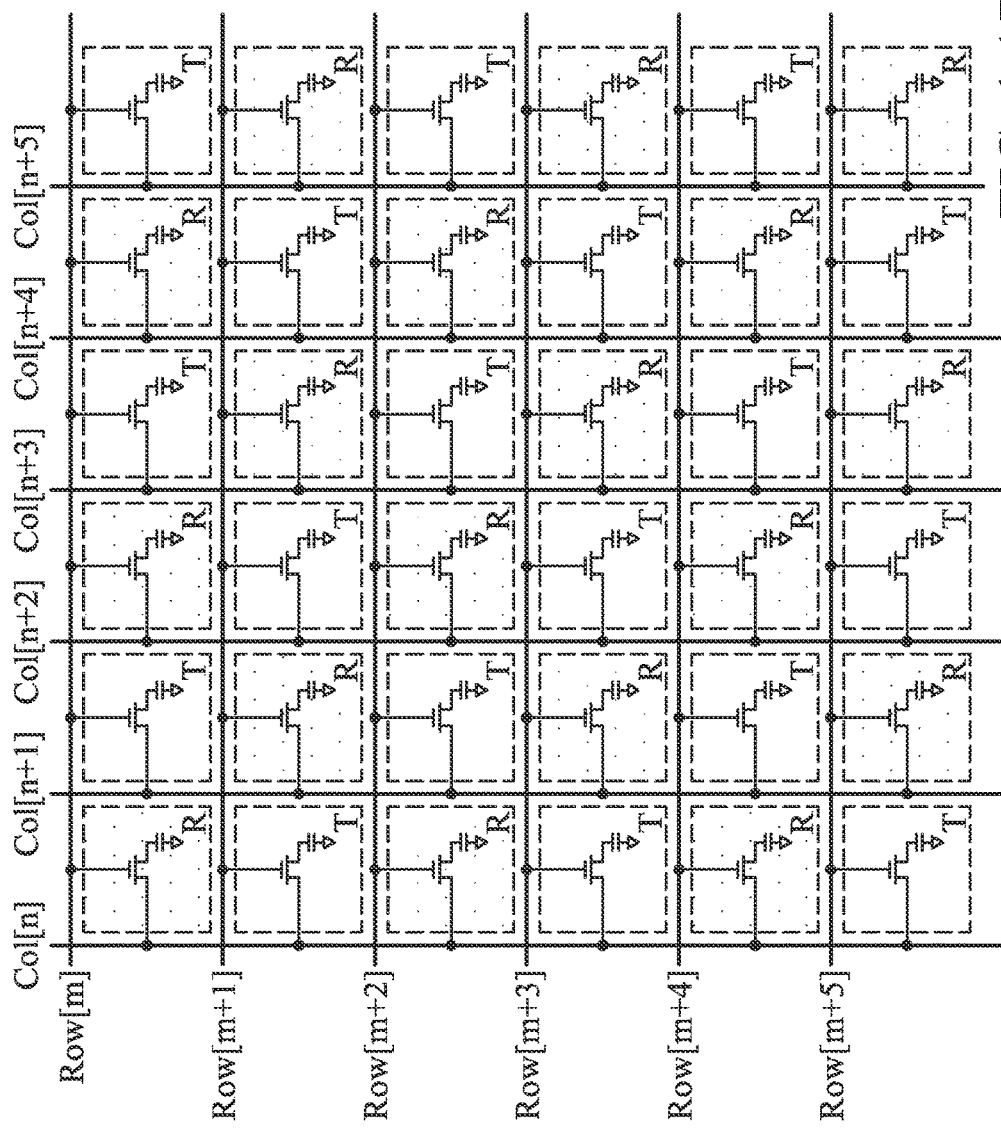
FIG. 1 shows a structure of a sub-pixel array of a conventional transflective type liquid crystal panel.
Figure 3:
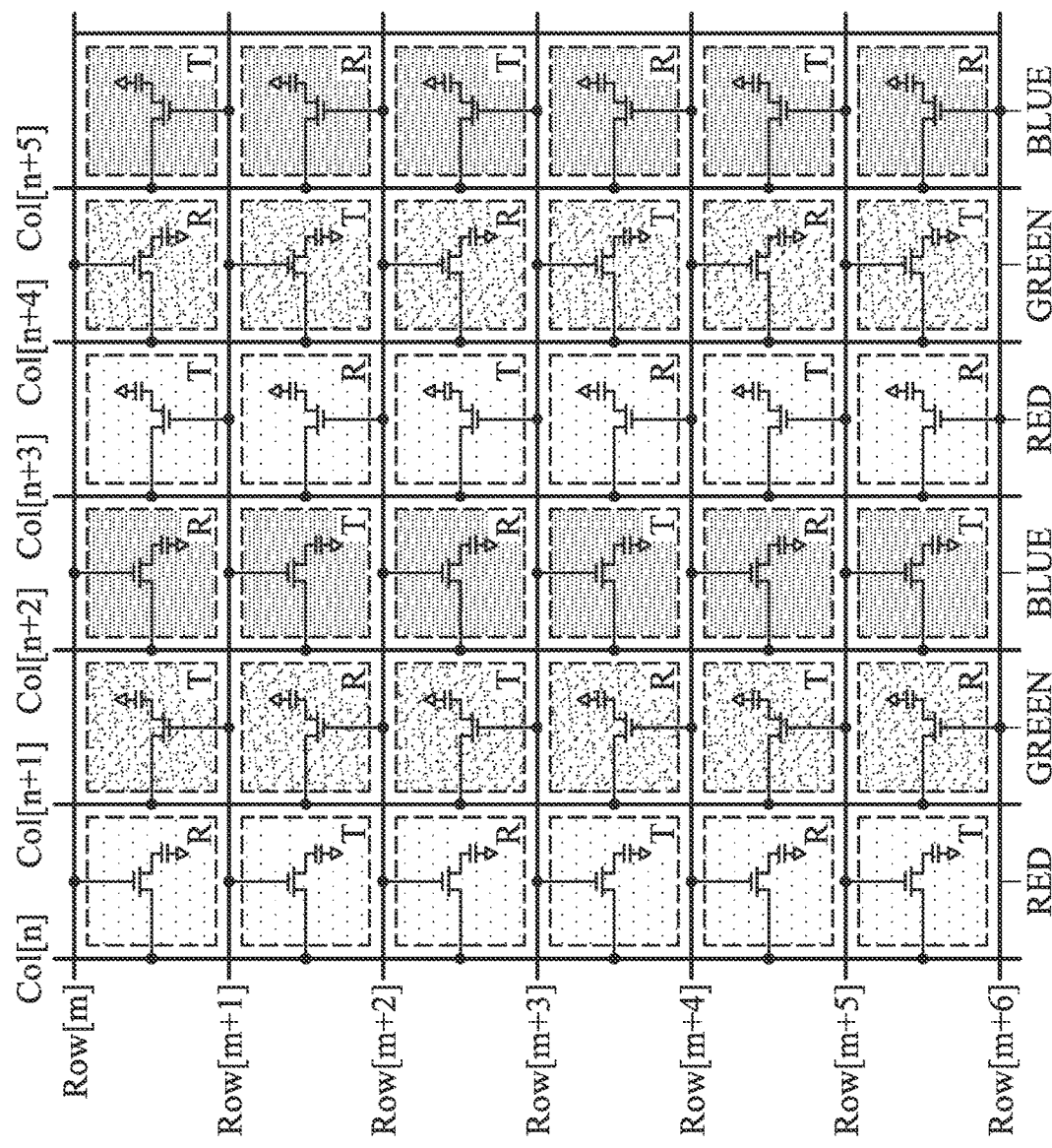
FIG. 3 shows an example of the sub-pixel array of FIG. 1 covered by a color filter.
Figure 4:
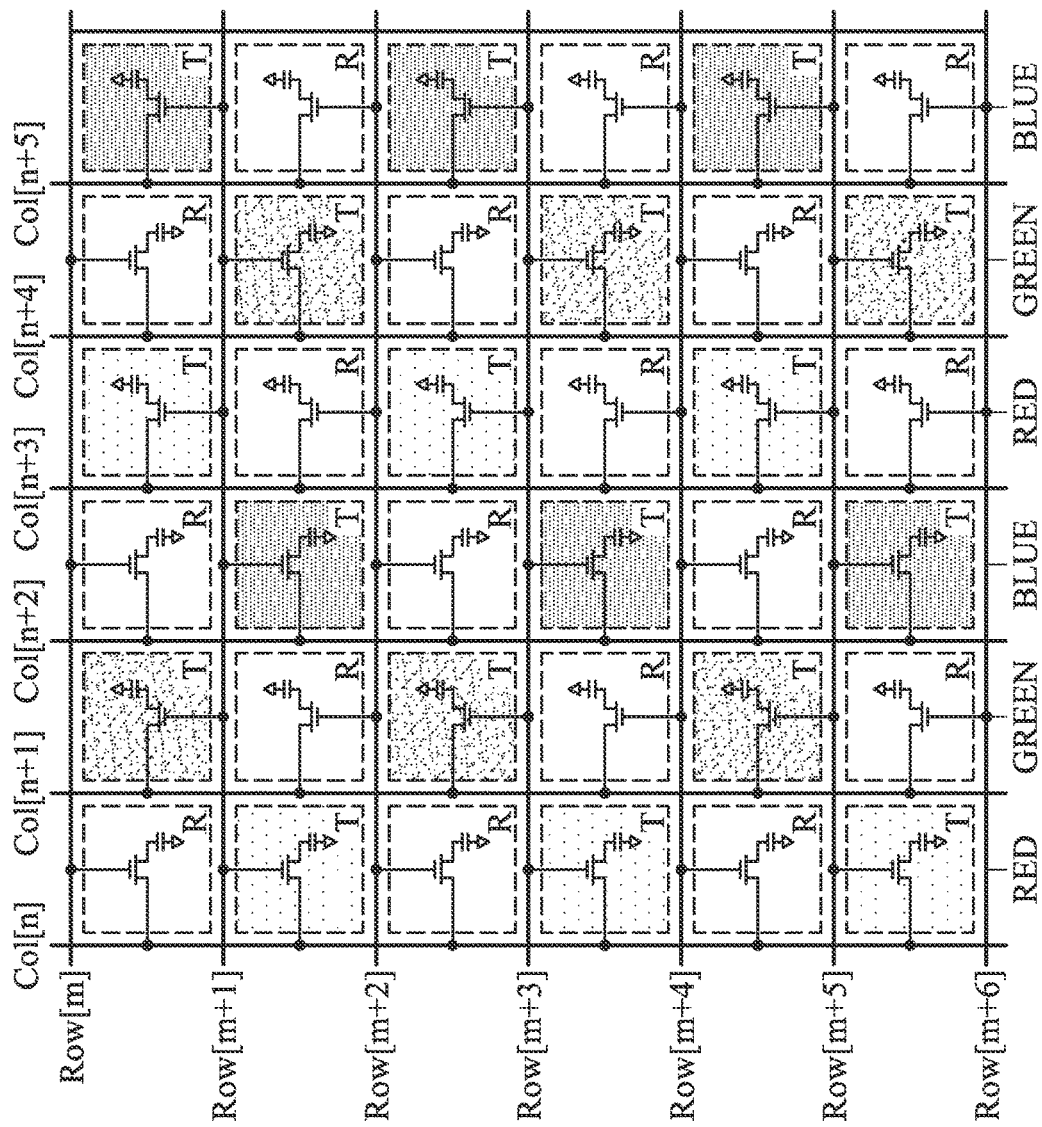
FIG. 4 shows an example of the sub-pixel array of FIG. 1 covered by a color filter.
Figure 5:
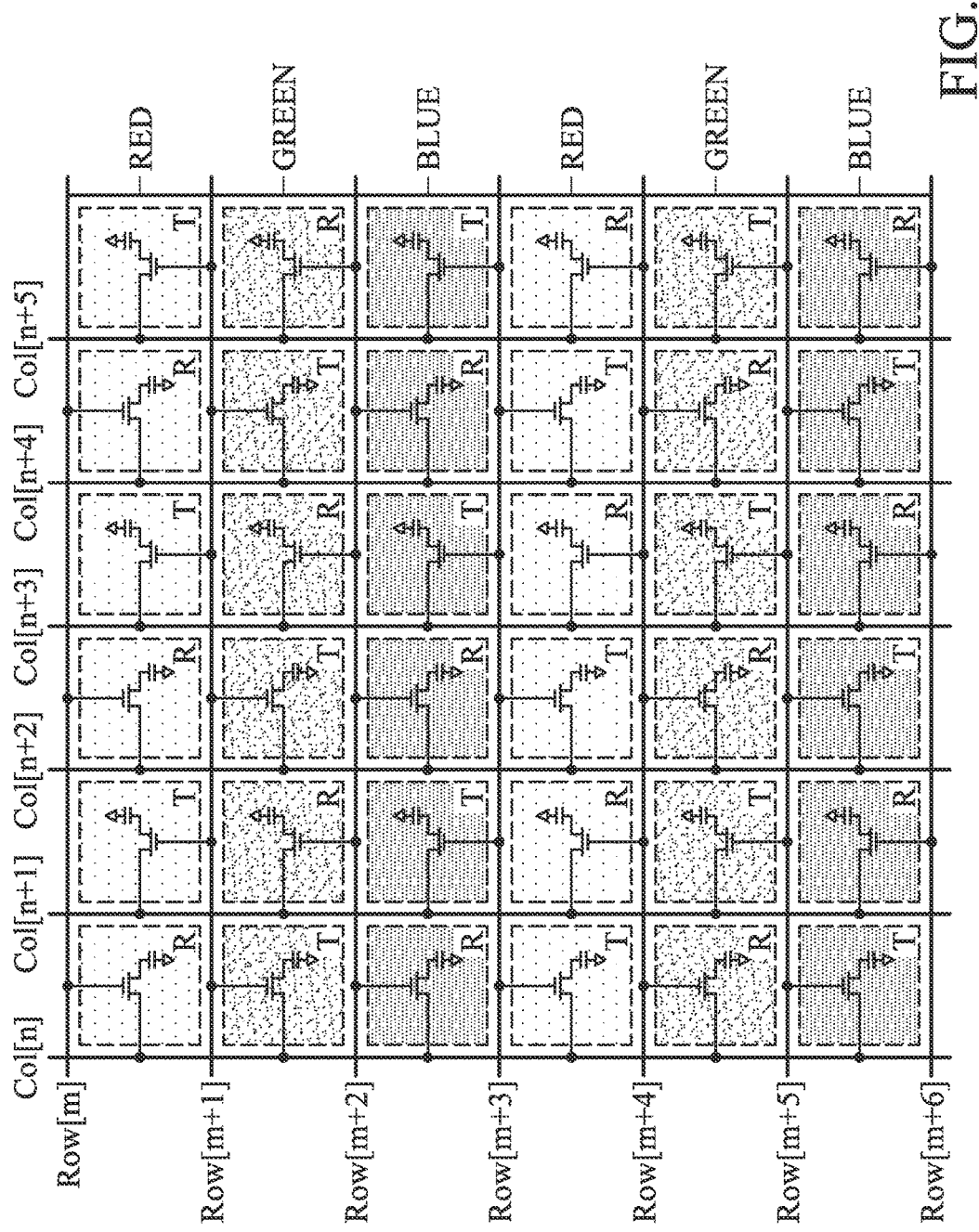
FIG. 5 shows an example of the sub-pixel array of FIG. 1 covered by a color filter.
Figure 6:
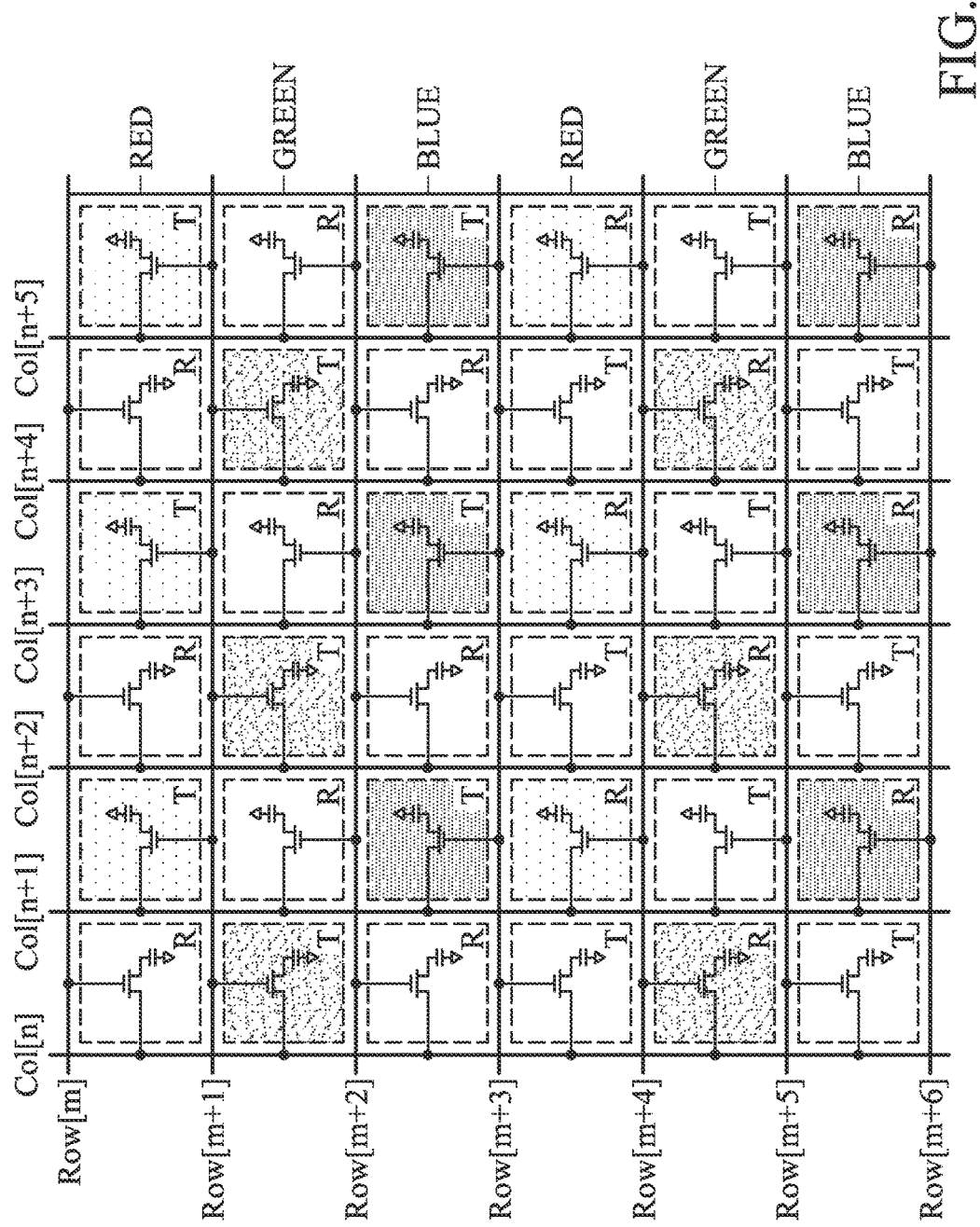
FIG. 6 shows an example of the sub-pixel array of FIG. 1 covered by a color filter.

FIGS. 3~6 show examples of the sub-pixel array shown in FIG. 1 applied with a color filter. The color filter applied to the sub-pixel array of the transflective type liquid crystal panel of Embodiment 1 can be a column stripe type color filter, as shown in FIG. 3, wherein the three colors RED, GREEN, and BLUE respectively cover a sub-pixel column. In this case, the adjacent three colored transmissive or reflective sub-pixels form a pixel capable of displaying a white color. Another example of a column stripe type color filter is shown in FIG. 4, wherein the portions of the color filter right above the reflective sub-pixels R are dug out such that the reflective sub-pixels R only display gray levels (namely, white, gray, and black). This example of the transflective type liquid crystal panel is suited for displaying simple messages which don't need high quality display performance, such as time or an alert symbol, in a power saving mode (the backlight is turned off) or in an outdoor environment. Other than the column stripe type color filter, the color filter can be a row stripe type color filter, as shown in FIG. 5, wherein the three colors RED, GREEN, and BLUE respectively cover a sub-pixel row. In this case, the adjacent three colored transmissive or reflective sub-pixels form a pixel capable of displaying a white color. Similarly, another example of a row stripe type color filter is shown in FIG. 6, wherein the portions of the color filter right above the reflective sub-pixels R are dug out such that the reflective sub-pixels R only display gray levels. The color filter can also arrange the three colors RED, GREEN, and BLUE in an oblique stripe or in an island shape to present a uniform mosaic pattern.

Four examples of a color filter to be applied to the sub-pixel array of the transflective type liquid crystal panel of Embodiment 1 are described above, but the disclosure is not limited thereto. The color filter is not limited to three colors RED, GREEN, and BLUE. The color filter can include four colors, for example, RED, GREEN, BLUE, and WHITE, or RED, GREEN, BLUE, and YELLOW. In this case, the adjacent four colored transmissive or reflective sub-pixels form a pixel capable of displaying a white color.

Figure 7A:
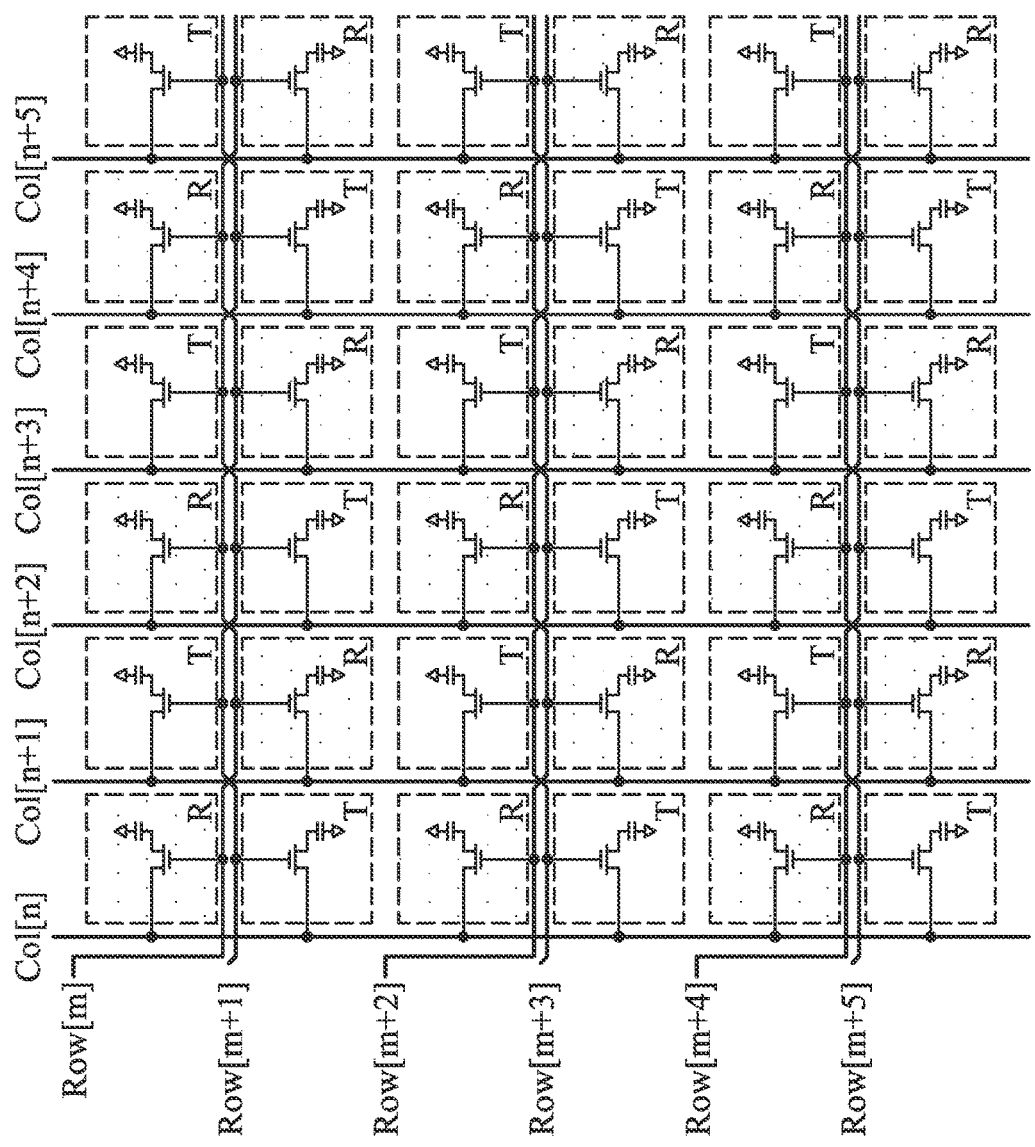
FIG. 7a shows a structure of a sub-pixel array of a transflective type liquid crystal panel in accordance with Embodiment 2 of the disclosure.

FIG. 7a shows a structure of a sub-pixel array of a transflective type liquid crystal panel in accordance with Embodiment 2 of the disclosure. As shown in FIG. 7a, the gate lines Row[m] and Row[m+1] are arranged between the first and second sub-pixel rows. The gate lines Row[m+2] and Row[m+3] are arranged between the third and fourth sub-pixel rows. The gate lines Row[m+4] and Row[m+5] are arranged between the fifth and sixth sub-pixel rows. The gate line Row[m] is connected to all of the reflective sub-pixels R in the first and second rows. The gate line Row[m+1] is connected to all of the transmissive sub-pixels T in the first and second rows. Similarly, the gate line Row[m+2] is connected to all of the reflective sub-pixels R in the third and fourth rows. The gate line Row[m+3] is connected to all of the transmissive sub-pixels T in the third and fourth rows. The gate line Row[m+4] is connected to all of the reflective sub-pixels R in the fifth and sixth rows. The gate line Row[m+5] is connected to all of the transmissive sub-pixels T in the fifth and sixth rows.

Figure 7B:
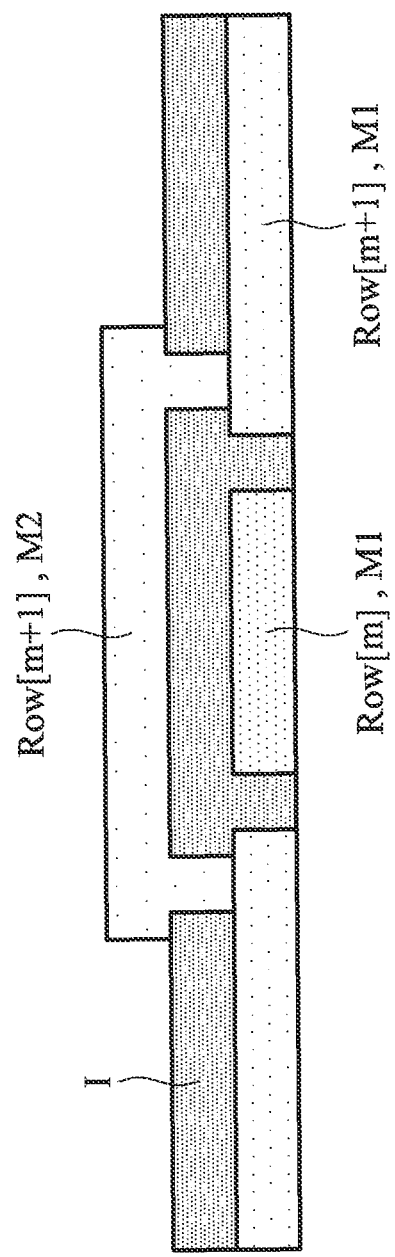
FIG. 7b is a sectional view showing a gate line crossing over the other gate line by a bridge.

Embodiment 2 is the same as Embodiment 1 in that each gate line is used to drive either the transmissive sub-pixel T or the reflective sub-pixel R. Therefore, Embodiment 2 can achieve the same advantage as those in Embodiment 1. However, the structure of Embodiment 2 is that two gate lines are arranged between a pair of adjacent sub-pixel rows. Because one gate line has to connect with sub-pixels above the gate line and sub-pixels below the gate line alternately in the row direction, as shown in FIG. 7b, a gate line (for example, Row[m+1]) crosses over the other gate line (for example, Row[m]) via a bridge to change their relative positions in the column direction. As for practical application, the crossing-over layer and the crossed-over layer would be exchanged every cross section to unify the loading. It means that Row[m+1] crosses over Row[m] at a cross point and Row[m] crosses over Row[m+1] at the next cross point on the same rows. In this way, on a first metal layer M1 made for the gate lines, at least a second metal layer M2 made for the bridge and a dielectric layer I are added. The dielectric layer I is etched to form a through hole for electrically connecting the second metal layer M2 and the first metal layer M1. The data lines are arranged in a normal manner that each data line of a column is connected to all of the transmissive sub-pixels T and the reflective sub-pixels R in that column.

Because two adjacent gate lines cross each other, the structure of the sub-pixel array of Embodiment 2 is called "cross arrangement" for convenience. In this way, the structure of Embodiment 2 can shortly be called "cross arrangement for gate line and normal arrangement for data line." Embodiment 2 doesn't only achieve the advantages of Embodiment 1, but also has no need to add an additional gate line. The number of gate lines is the same as the number of rows.

If the current expressions cover both cases, such like [m+1] always bridge over and both [m] & [m+1] alternate every cross over, it's no problem.

Figure 8:
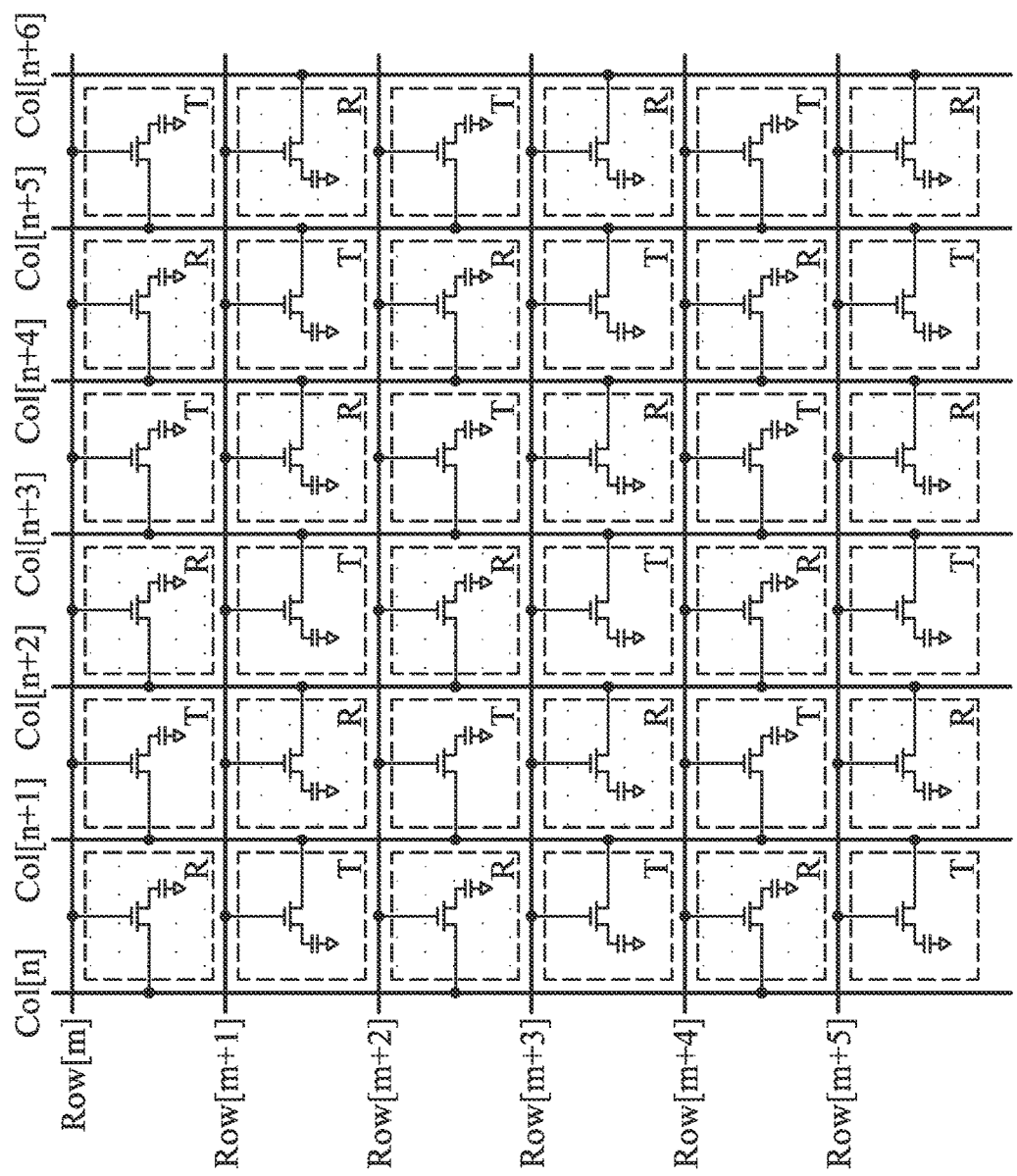
FIG. 8 shows a structure of a sub-pixel array of a transflective type liquid crystal panel in accordance with Embodiment 3 of the disclosure.

FIG. 8 shows a structure of a sub-pixel array of a transflective type liquid crystal panel in accordance with Embodiment 3 of the disclosure. As shown in FIG. 8, the gate line is arranged in a normal manner that the gate line of each row is connected to all of the transmissive sub-pixels T and the reflective sub-pixels R in that row. However, only the reflective sub-pixels R in the first column is connected to the first data line Col[n]. The transmissive sub-pixels T in the first column are not connected to the first data line Col[n], but connected to the second data line Col[n+1]. The transmissive sub-pixels T in the second column are also connected to the second data line Col[n+1], and the reflective sub-pixels R in the second column are also connected to the third data line Col[n+2]. The sub-pixels in the remaining columns are connected to the data lines in the same manner that the reflective sub-pixels R in two adjacent rows share one data line and the transmissive sub-pixels T in two adjacent rows share another data line. At last, the reflective sub-pixels R in the last column (the sixth column shown in FIG. 8) are connected to the seventh data line Col[n+6].

According to the naming method applied to Embodiments 1 and 2, the structure of Embodiment 3 cab be called "normal arrangement for gate line and flip arrangement for data line." In Embodiment 3, the transmissive sub-pixels T and the reflective sub-pixels R are connected to different data lines. That is to say, each data line is used to drive either the transmissive sub-pixels T or the reflective sub-pixels R. In comparison with the prior art, although an additional data line Col[n+6] is necessary, as for one data line, the data line can supply voltage corresponding to only one gamma curve to the sub-pixels T or the reflective sub-pixels R. Therefore, the gamma curve used to supply voltage for one data line doesn't have to be switched every time one row is scanned, which reduces driving complexity and saves power.

Figure 9:
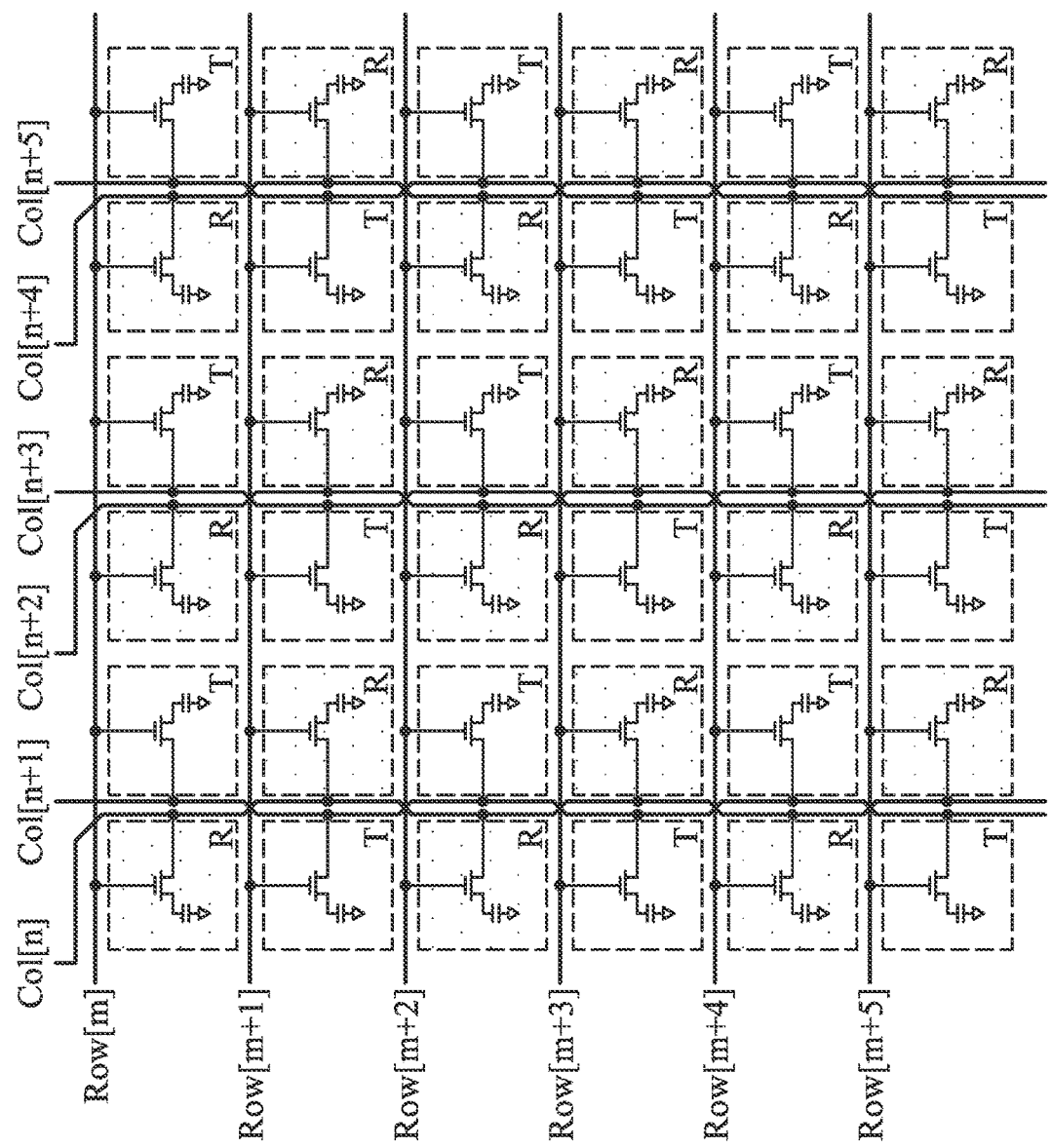
FIG. 9 shows a structure of a sub-pixel array of a transflective type liquid crystal panel in accordance with Embodiment 4 of the disclosure.

FIG. 9 shows a structure of a sub-pixel array of a transflective type liquid crystal panel in accordance with Embodiment 4 of the disclosure. As shown in FIG. 9, the data lines Col[n] and Col[n+1] are arranged between the first and second sub-pixel columns. The data lines Col[n+2] and Col[n+3] are arranged between the third and fourth sub-pixel columns. The data lines Col[n+4] and Col[n+5] are arranged between the fifth and sixth sub-pixel columns. The data line Col[n] is connected to all of the reflective sub-pixels R in the first and second columns. The data line Col[m+1] is connected to all of the transmissive sub-pixels T in the first and second columns. Similarly, the data line Col[n+2] is connected to all of the reflective sub-pixels R in the third and fourth columns. The data line Col[n+3] is connected to all of the transmissive sub-pixels T in the third and fourth columns. The data line Col[n+4] is connected to all of the reflective sub-pixels R in the fifth and sixth columns. The data line Col[n+5] is connected to all of the transmissive sub-pixels T in the fifth and sixth columns.

Embodiment 4 is the same as Embodiment 3 in that each data line is used to supply voltage to either the transmissive sub-pixel T or the reflective sub-pixel R. Therefore, Embodiment 4 can achieve the same advantage as those in Embodiment 3. However, the structure of Embodiment 4 is that two data lines are arranged between a pair of adjacent sub-pixel columns. Because one data line has to connect with sub-pixels at the left of the data line and sub-pixels at the right of the data line alternately in the column direction, a data line crosses over the other data line via a bridge (this structure is the same as that shown in FIG. 7b of Embodiment 2) to change their relative positions in the row direction. The gate lines are arranged in a normal manner that each gate line of a row is connected to all of the transmissive sub-pixels T and the reflective sub-pixels R in that row. Therefore, the structure of Embodiment 4 can be called "normal arrangement for gate line and cross arrangement for data line."

The above embodiments are applied to the sub-pixel array where one transmissive sub-pixel T and one reflective sub-pixel R are arranged alternately in the row direction and in the column direction. However, the sub-pixel array of the transflective type liquid crystal panel of the disclosure is not limited to this layout. For example, two, three, or four transmissive sub-pixels T and two, three, or four reflective sub-pixels R can be arranged alternately in the row direction, and one transmissive sub-pixel T and one reflective sub-pixel R are arranged alternately in the column direction. In this structure, the wire arrangement described in Embodiments 5 and 6 can be utilized.

Figure 10:
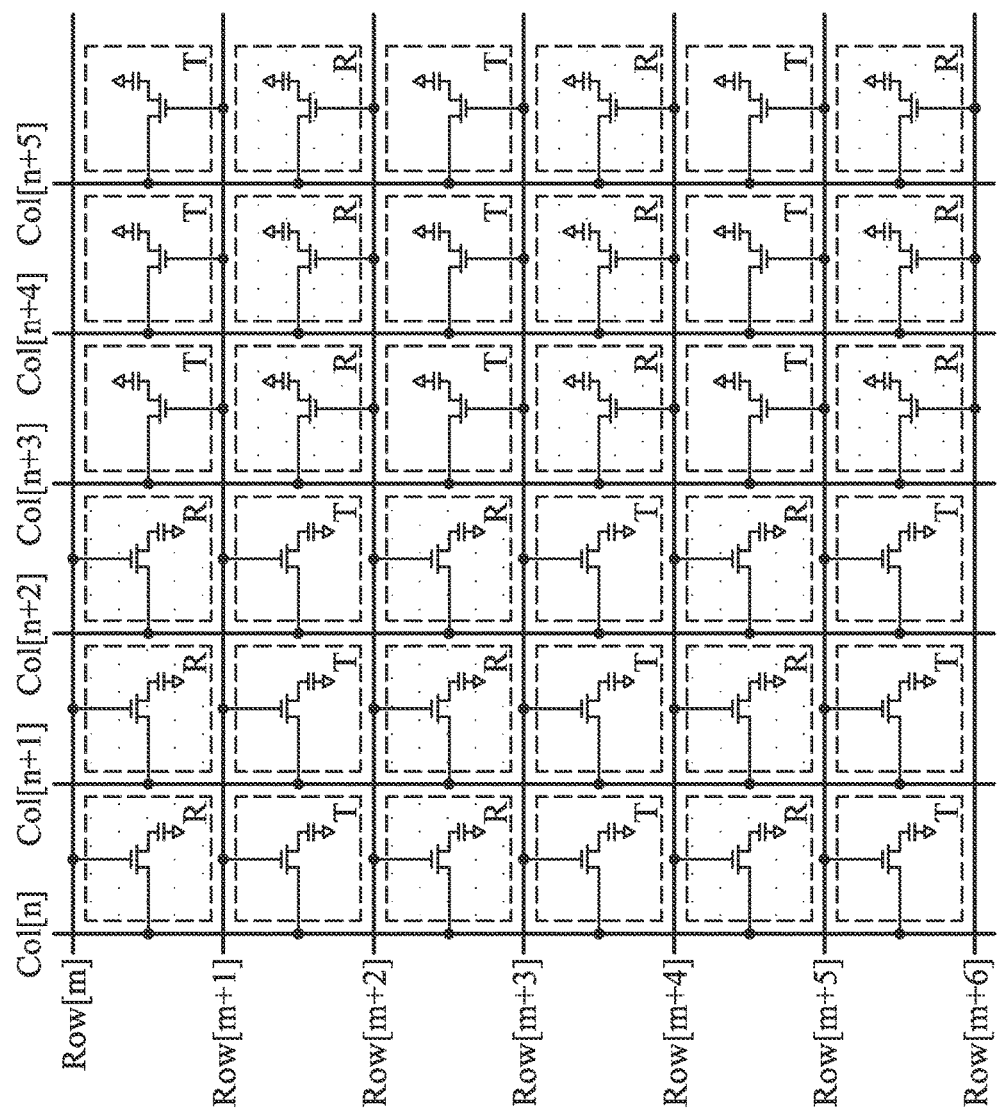
FIG. 10 shows a structure of a sub-pixel array of a transflective type liquid crystal panel in accordance with Embodiment 5 of the disclosure.

FIG. 10 shows a structure of a sub-pixel array of a transflective type liquid crystal panel in accordance with Embodiment 5 of the disclosure. Embodiment 5 applies the wire arrangement "flip arrangement for gate line and normal arrangement for data line" to the structure where three transmissive sub-pixels T and three reflective sub-pixels R are arranged alternately in the row direction, and one transmissive sub-pixel T and one reflective sub-pixel R are arranged alternately in the column direction. Therefore, the concept of Embodiment 5 is the same as that of Embodiment 1, so as to achieve the same advantages as those in Embodiment 1. Once a gate line is scanned, the source driver doesn't have to supply voltage corresponding to the transmissive gamma curve and voltage corresponding to the reflective gamma curve at the same time to all data lines, but the source driver can only supply voltage corresponding to a single gamma curve to all data line. Therefore, the driving complexity can be reduced.

Figure 11:
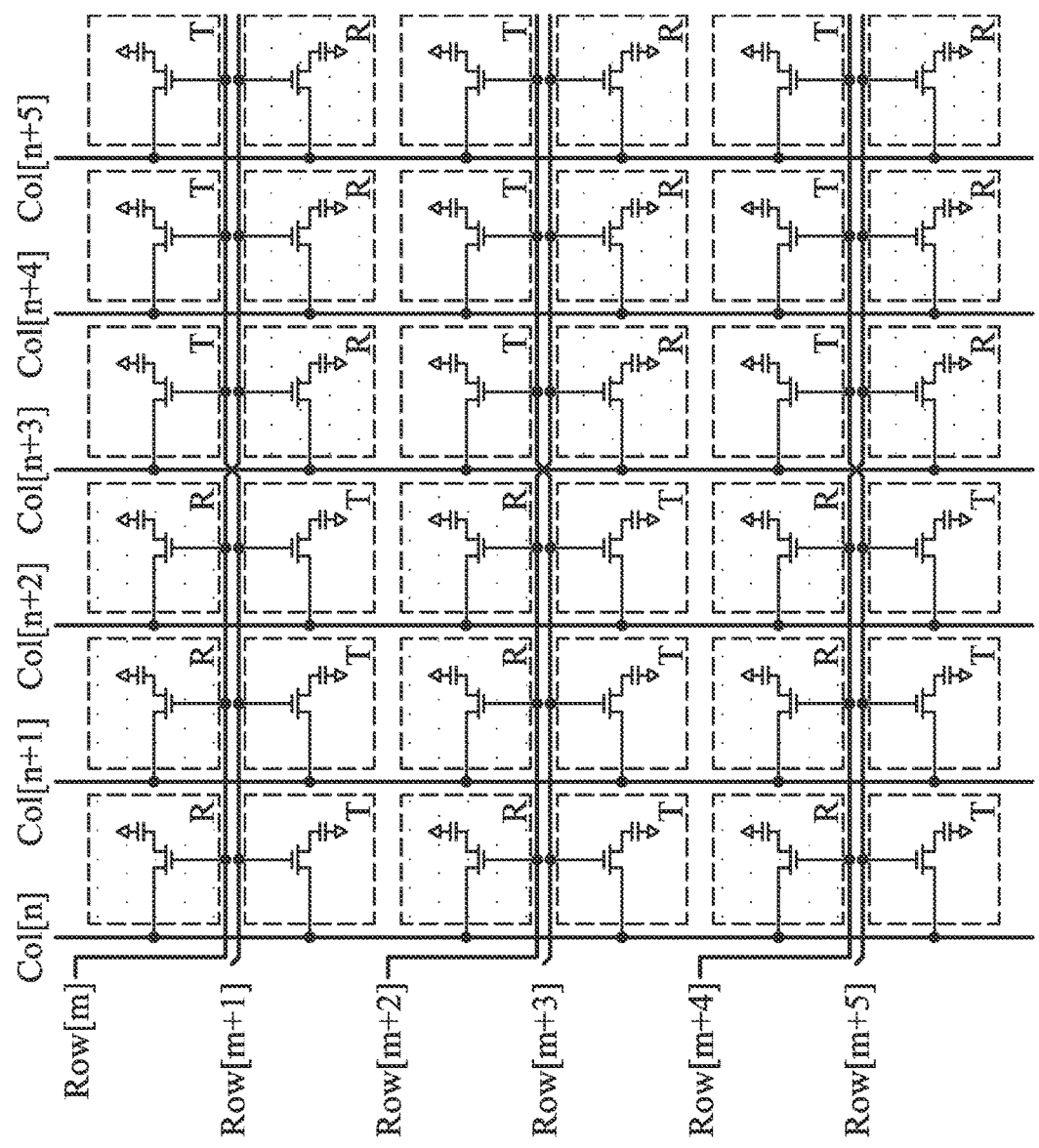
FIG. 11 shows a structure of a sub-pixel array of a transflective type liquid crystal panel in accordance with Embodiment 6 of the disclosure.

FIG. 11 shows a structure of a sub-pixel array of a transflective type liquid crystal panel in accordance with Embodiment 6 of the disclosure. Embodiment 6 applies the wire arrangement "cross arrangement for gate line and normal arrangement for data line" to the structure where three transmissive sub-pixels T and three reflective sub-pixels R are arranged alternately in the row direction, and one transmissive sub-pixel T and one reflective sub-pixel R are arranged alternately in the column direction. Therefore, the concept of Embodiment 6 is the same as that of Embodiment 2, so as to achieves the same advantages as those in Embodiment 2.

The sub-pixel array of the transflective type liquid crystal panel can be a structure two, three, or four transmissive sub-pixels T and two, three, or four reflective sub-pixels R can be arranged alternately in the column direction, and one transmissive sub-pixel T and one reflective sub-pixel R are arranged alternately in the row direction. In this structure, the wire arrangement described in Embodiments 7 and 8 can be utilized.

Figure 12:
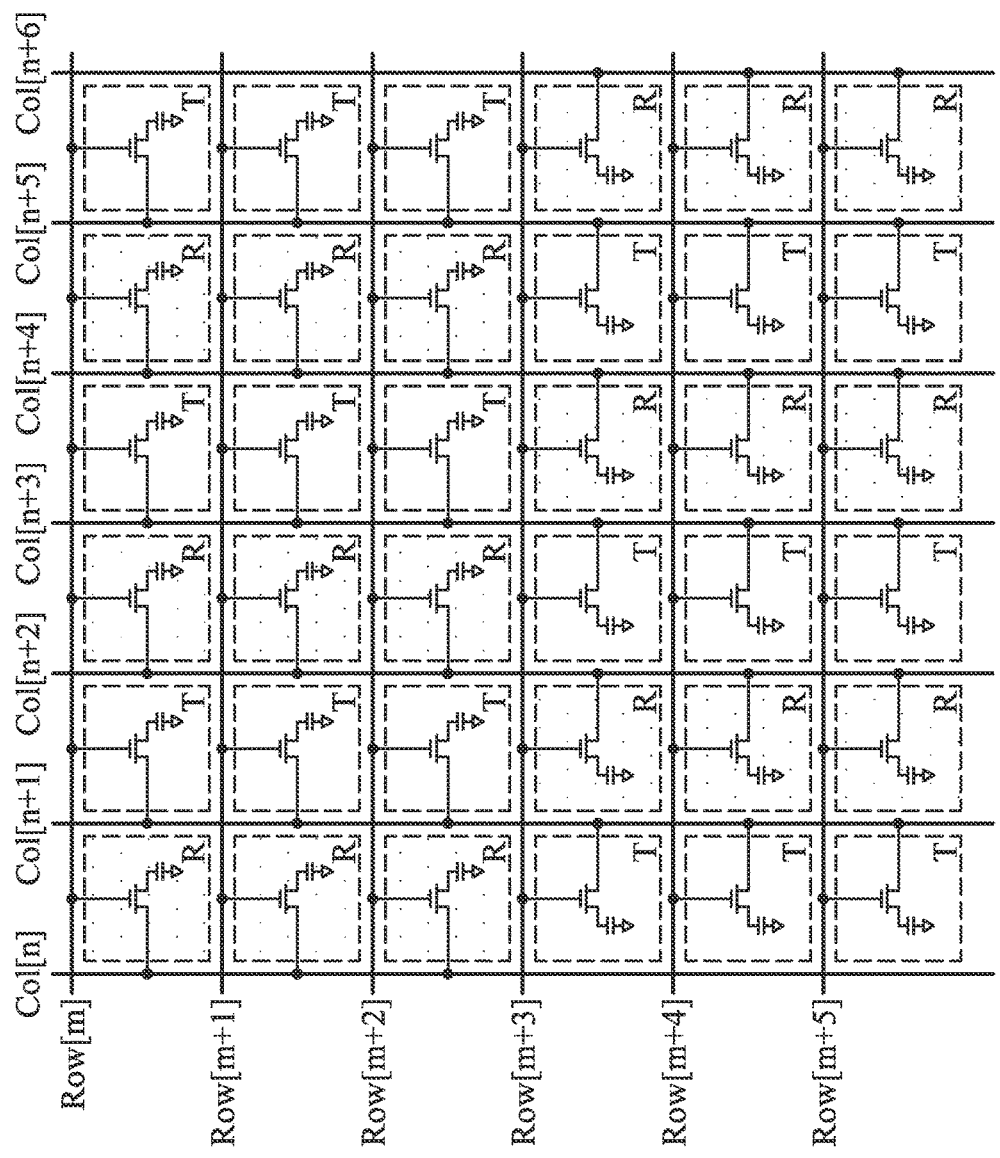
FIG. 12 shows a structure of a sub-pixel array of a transflective type liquid crystal panel in accordance with Embodiment 7 of the disclosure.

FIG. 12 shows a structure of a sub-pixel array of a transflective type liquid crystal panel in accordance with Embodiment 7 of the disclosure. Embodiment 7 applies the wire arrangement "normal arrangement for gate line and flip arrangement for data line" to the structure where three transmissive sub-pixels T and three reflective sub-pixels R are arranged alternately in the column direction, and one transmissive sub-pixel T and one reflective sub-pixel R are arranged alternately in the row direction. Therefore, the concept of Embodiment 7 is the same as that of Embodiment 3, so as to achieve the same advantages as those in Embodiment 3. As for one data line, the data line can only supply voltage corresponding to one gamma curve to the sub-pixels T or the reflective sub-pixels R. Therefore, the gamma curve used to supply voltage for one data line doesn't have to be switched every time one row is scanned, which reduces driving complexity.

Figure 13:
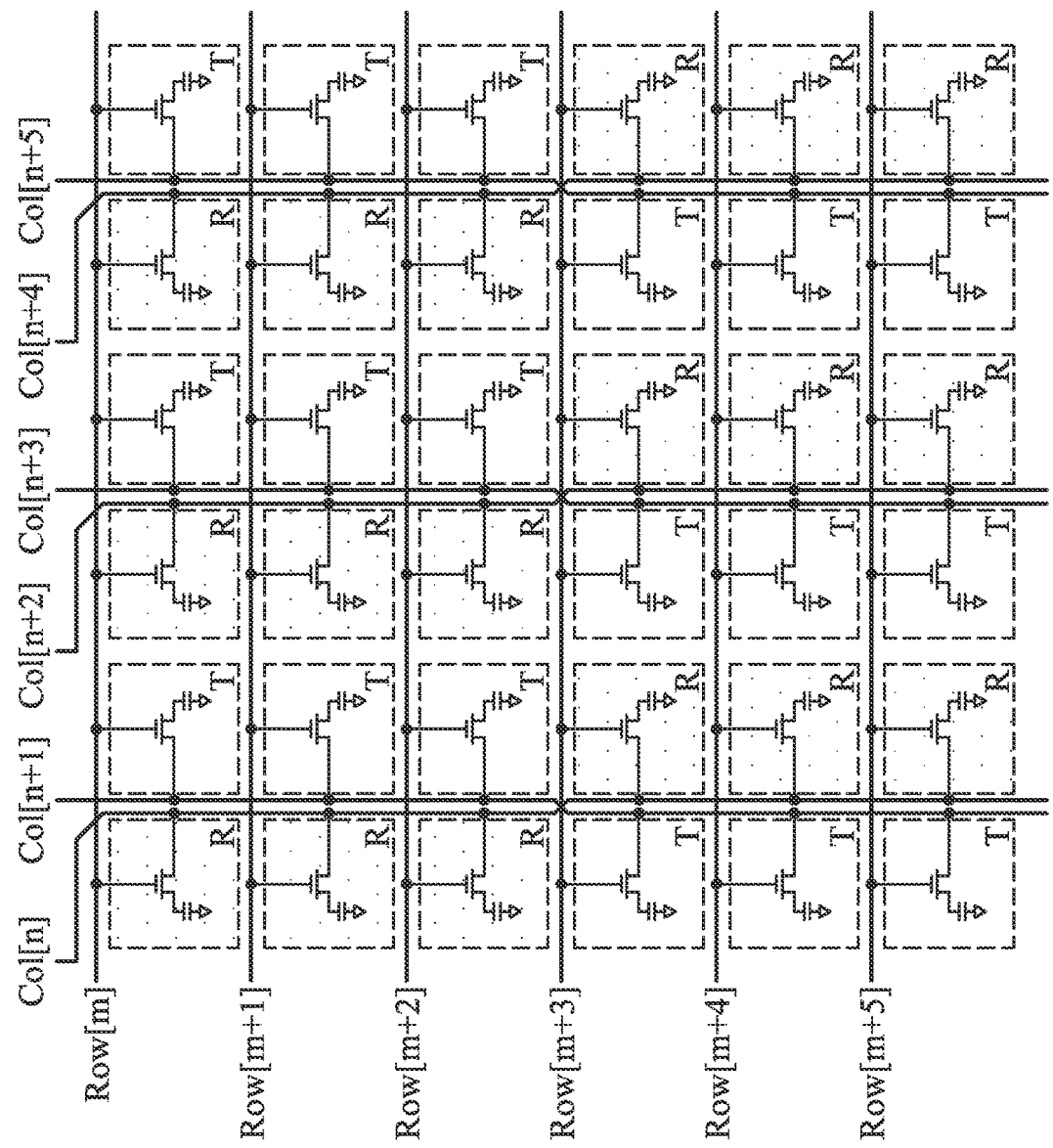
FIG. 13 shows a structure of a sub-pixel array of a transflective type liquid crystal panel in accordance with Embodiment 8 of the disclosure.

FIG. 13 shows a structure of a sub-pixel array of a transflective type liquid crystal panel in accordance with Embodiment 8 of the disclosure. Embodiment 8 applies the wire arrangement "normal arrangement for gate line and cross arrangement for data line" to the structure where three transmissive sub-pixels T and three reflective sub-pixels R are arranged alternately in the column direction, and one transmissive sub-pixel T and one reflective sub-pixel R are arranged alternately in the row direction. Therefore, the concept of Embodiment 8 is the same as that of Embodiment 4, so as to achieve the same advantages as those in Embodiment 4.

Figure 14A:
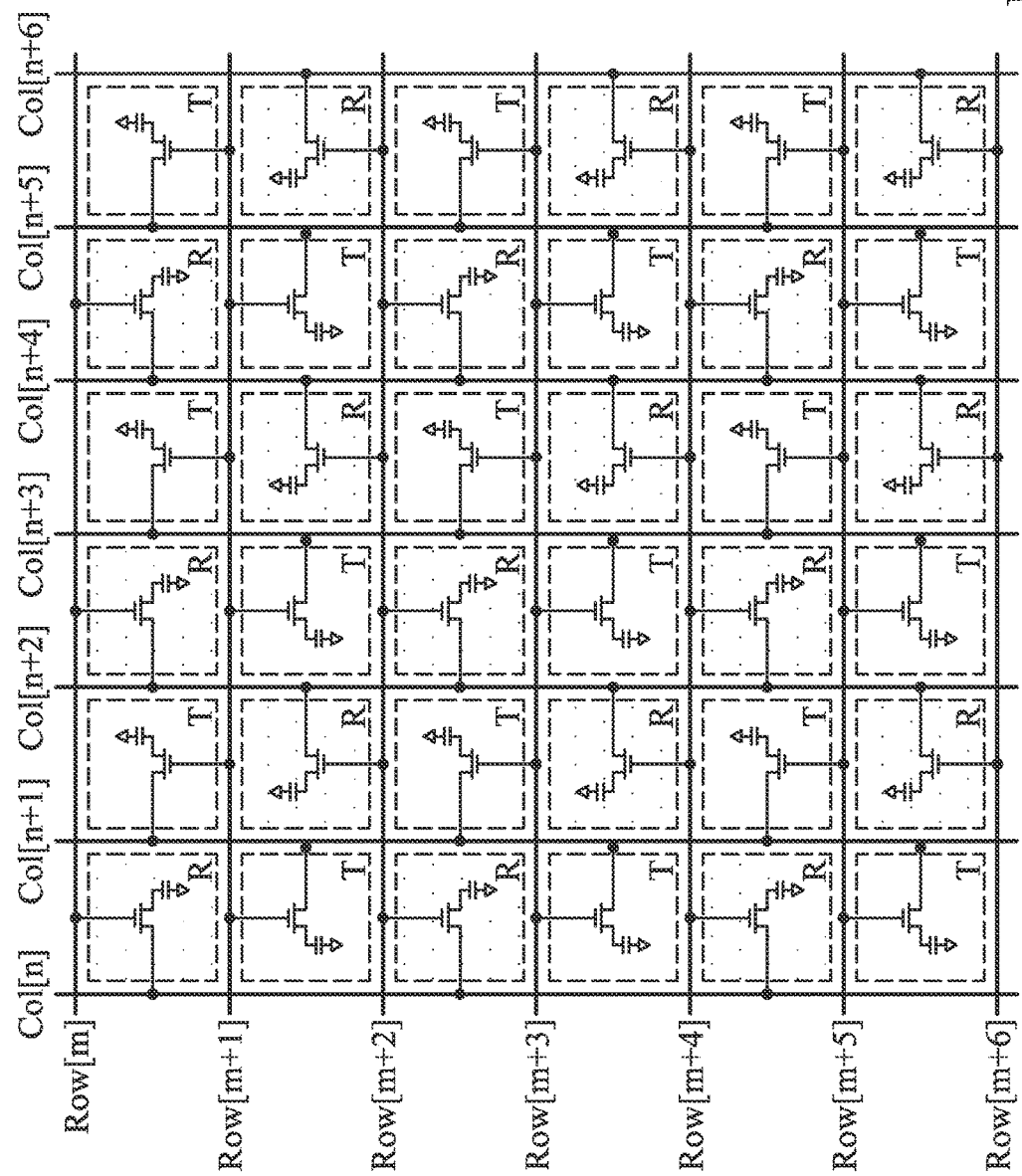
FIG. 14a shows a structure of a sub-pixel array of a transflective type liquid crystal panel in accordance with Embodiment 9 of the disclosure.

In addition to the wire arrangements described in Embodiments 1~8, the disclosure also provides a wire arrangement "flip arrangement for gate line and flip arrangement for data line." FIG. 14a shows a structure of a sub-pixel array of a transflective type liquid crystal panel in accordance with Embodiment 9 of the disclosure. As shown in FIG. 14a, each gate line is only connected to either the transmissive sub-pixels T or the reflective sub-pixels R, and each data line is only connected to either the transmissive sub-pixels T or the reflective sub-pixels R. Therefore, the advantages of Embodiments 1 and 3 are obtained. Once a gate line is scanned, the source driver doesn't have to supply voltage corresponding to the transmissive gamma curve and voltages corresponding to the reflective gamma curve at the same time to all data line, but the source driver can supply voltage that only corresponds to a single gamma curve to all data lines. As for one data line, the data line can only supply voltage corresponding to one gamma curve to the sub-pixels T or the reflective sub-pixels R. Therefore, the gamma curve used to supply voltage for one data line doesn't have to be switched every time one row is scanned, which reduces driving complexity.

Figure 14B:
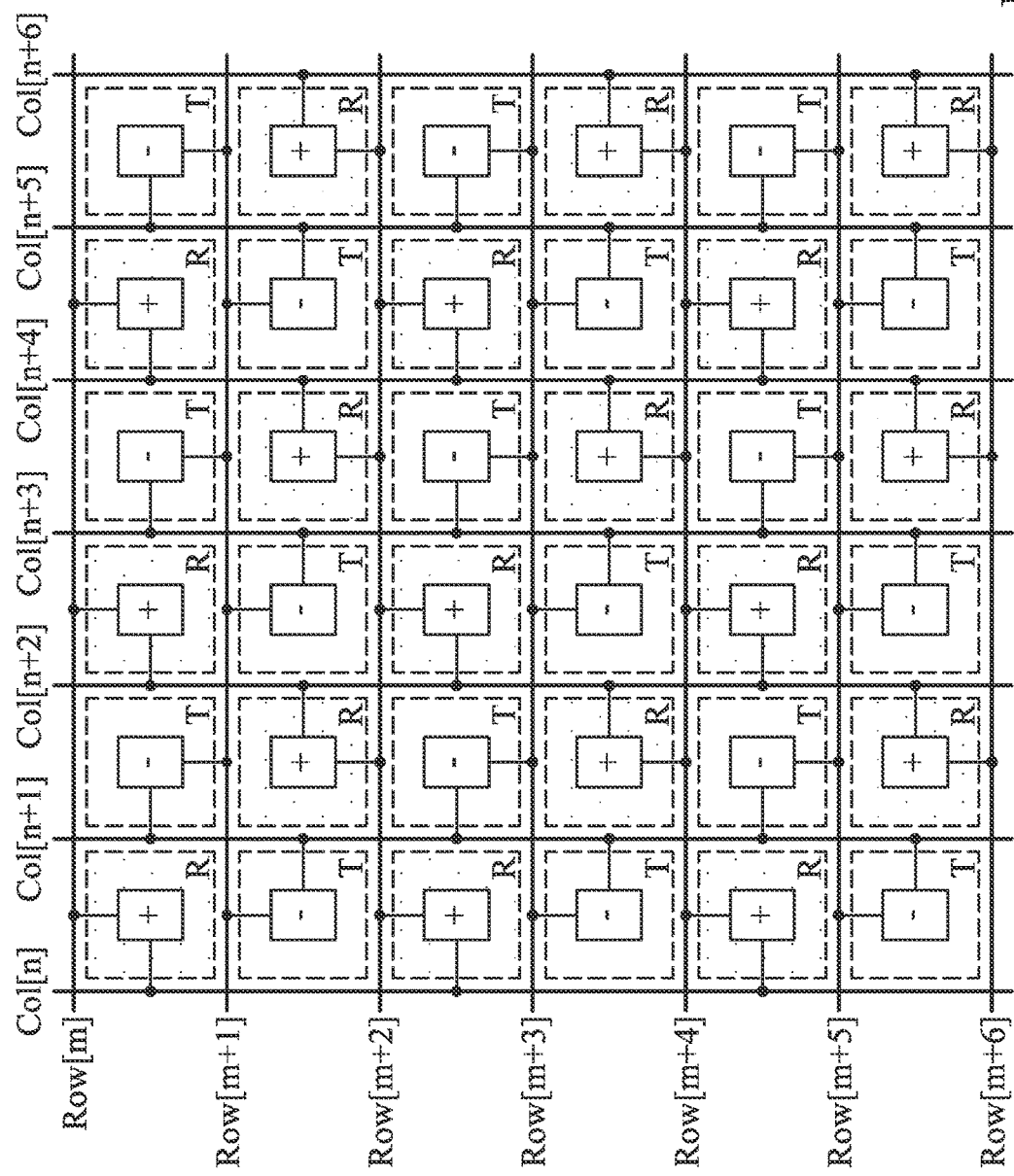
FIG. 14b shows a data polarity layout of a sub-pixel array of a transflective type liquid crystal panel in accordance with Embodiment 9 of the disclosure.

FIG. 14b shows a data polarity layout of a sub-pixel array of a transflective type liquid crystal panel in accordance with Embodiment 9 of the disclosure. As shown in FIG. 14b, during a frame, the polarity of the transmissive sub-pixel T is positive (+) and the polarity of the reflective sub-pixel R is negative (−). In a mix mode, the panel is driven in dot inversion, so a good display performance can be obtained. However, because of the variation difference of the driving voltage of the transmissive sub-pixel T and the reflective sub-pixel R, for example, the difference in feed-through voltages, flickering due to the different brightness of the transmissive sub-pixel T and the reflective sub-pixel R driven in dot inversion are easily observed.

Figure 14C:
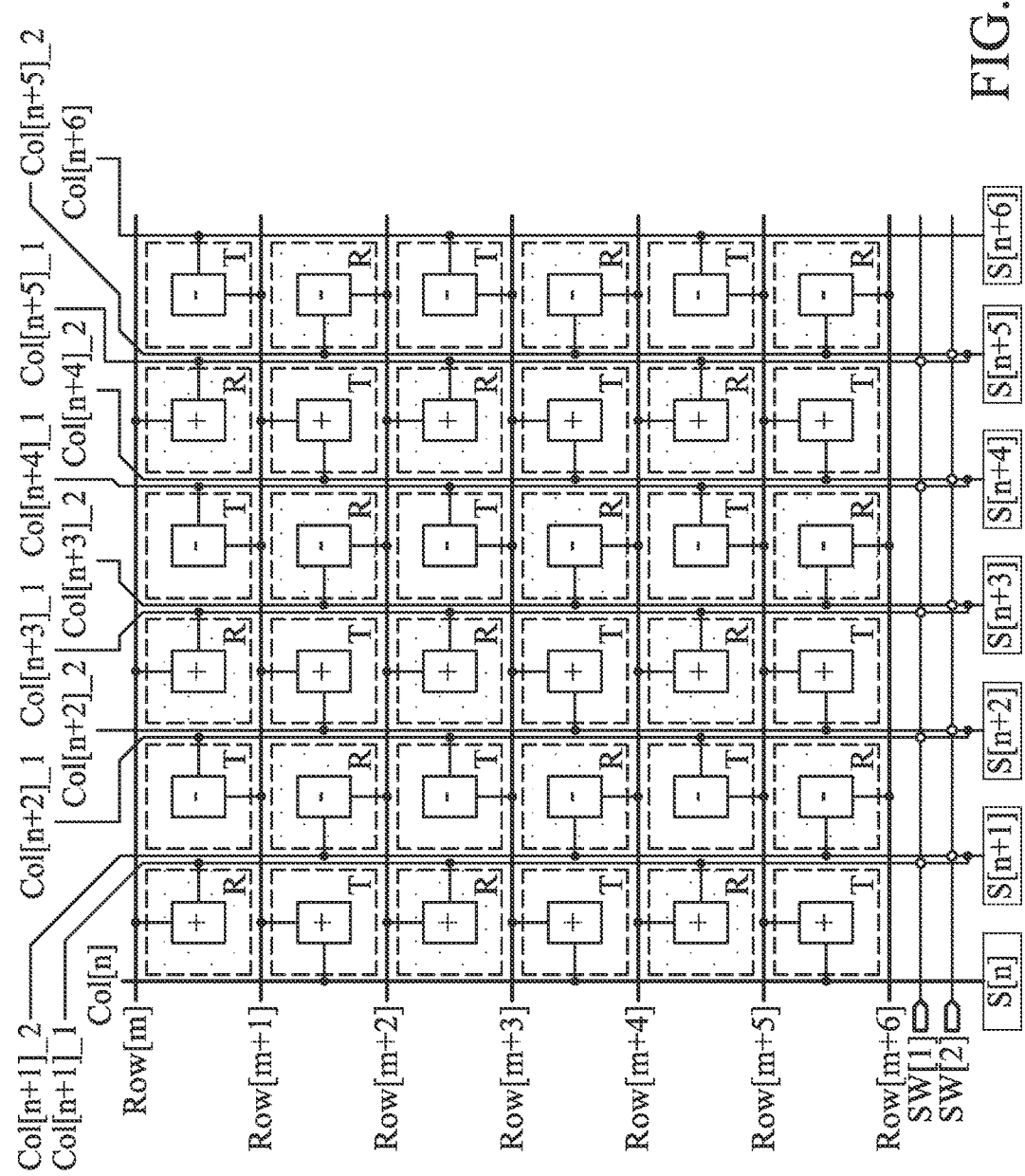
FIG. 14c shows another data polarity layout of a sub-pixel array of a transflective type liquid crystal panel in accordance with Embodiment 9 of the disclosure.

FIG. 14c shows another data polarity layout of a sub-pixel array of a transflective type liquid crystal panel in accordance with Embodiment 9 of the disclosure. As shown in FIG. 14c, there are two data lines between two adjacent columns and both of them are connected to the same demultiplexor and data output terminal S. Two switch signals SW controls to turn on or turn off the two data line. The transmissive sub-pixels T in two adjacent columns are respectively connected to the data line close to them, and the reflective sub-pixels R in two adjacent columns are respectively connected to the data line close to them. During a frame, the polarities of the transmissive sub-pixel T in two adjacent columns are respectively positive (+) and negative (−), and the polarities of the reflective sub-pixel R in two adjacent columns are respectively positive (+) and negative (−). In this way, the brightness variation due to the driving in inversion can be compensated for so as to reduce the flickering and improve the image quality.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective type liquid crystal panel, comprising
a plurality of sub-pixels arranged in rows and columns to form a sub-pixel array;
a plurality of first wires extending along the row direction or the column direction; and
a plurality of second wires which are parallel with the first wires,
wherein the plurality of sub-pixels comprises transmissive sub-pixels and reflective sub-pixels, and each row and column in the sub-pixel array has both transmissive sub-pixels and reflective sub-pixels, wherein the first wire is connected to and drives the transmissive sub-pixels located at two sides of the first wire, and the second wire is connected to and drives the reflective sub-pixels located at two sides of the second wire.

2. The transflective type liquid crystal panel as claimed in claim 1, wherein the first wire and the second wire are gate lines extending in the row direction and arranged alternately in the column direction.

3. The transflective type liquid crystal panel as claimed in claim 1, wherein the first wire and the second wire are gate lines extending in the row direction and arranged between each pair of two adjacent sub-pixel rows.

4. The transflective type liquid crystal panel as claimed in claim 3, wherein the first wire comprises a first electrode layer and a second electrode layer.

5. The transflective type liquid crystal panel as claimed in claim 2, wherein one transmissive sub-pixel and one reflective sub-pixel are arranged alternately in the row direction and the column direction.

6. The transflective type liquid crystal panel as claimed in claim 3, wherein one transmissive sub-pixel and one reflective sub-pixel are arranged alternately in the row direction and the column direction.

7. The transflective type liquid crystal panel as claimed in claim 4, wherein one transmissive sub-pixel and one reflective sub-pixel are arranged alternately in the row direction and the column direction.

8. The transflective type liquid crystal panel as claimed in claim 2, wherein one transmissive sub-pixel and one reflective sub-pixel are arranged alternately in the column direction, and three transmissive sub-pixels and three reflective sub-pixels are arranged alternately in the row direction.

9. The transflective type liquid crystal panel as claimed in claim 3, wherein one transmissive sub-pixel and one reflective sub-pixel are arranged alternately in the column direction, and three transmissive sub-pixel and three reflective sub-pixels are arranged alternately in the row direction.

10. The transflective type liquid crystal panel as claimed in claim 4, wherein one transmissive sub-pixel and one reflective sub-pixel are arranged alternately in the column direction, and three transmissive sub-pixel and three reflective sub-pixels are arranged alternately in the row direction.

11. The transflective type liquid crystal panel as claimed in claim 1, wherein the first wire and the second wire are data lines extending in the column direction and arranged alternately in the row direction.

12. The transflective type liquid crystal panel as claimed in claim 1, wherein the first wire and the second wire are data lines extending in the column direction and arranged between each pair of two adjacent sub-pixel columns.

13. The transflective type liquid crystal panel as claimed in claim 12, wherein the first wire comprises a first electrode layer and a second electrode layer.

14. The transflective type liquid crystal panel as claimed in claim 11, wherein one transmissive sub-pixel and one reflective sub-pixel are arranged alternately in the row direction and the column direction.

15. The transflective type liquid crystal panel as claimed in claim 12, wherein one transmissive sub-pixel and one reflective sub-pixel are arranged alternately in the row direction and the column direction.

16. The transflective type liquid crystal panel as claimed in claim 13, wherein one transmissive sub-pixel and one reflective sub-pixel are arranged alternately in the row direction and the column direction.

17. The transflective type liquid crystal panel as claimed in claim 11, wherein one transmissive sub-pixel and one reflective sub-pixel are arranged alternately in the row direction, and three transmissive sub-pixels and three reflective sub-pixels are arranged alternately in the column direction.

18. The transflective type liquid crystal panel as claimed in claim 12, wherein one transmissive sub-pixel and one reflective sub-pixel are arranged alternately in the row direction, and three transmissive sub-pixels and three reflective sub-pixels are arranged alternately in the column direction.

19. The transflective type liquid crystal panel as claimed in claim 13, wherein one transmissive sub-pixel and one reflective sub-pixel are arranged alternately in the row direction, and three transmissive sub-pixels and three reflective sub-pixels are arranged alternately in the column direction.

20. The transflective type liquid crystal panel as claimed in claim 2, further comprising:
a plurality of third wires and fourth wires which are data lines extending along the column direction,
wherein the transmissive sub-pixels are connected to and driven by the third wires, and the reflective sub-pixels are connected to and driven by the fourth wires, and
the third wire and the fourth wire are arranged alternately in the row direction.

* * * * *